United States Patent [19]
Quick et al.

[11] 3,871,219
[45] Mar. 18, 1975

[54] TROLLING SPEED INDICATOR

[75] Inventors: Jerry L. Quick, Ogallala, Nebr.;
James D. Maxwell, Vancouver, Wash.

[73] Assignee: Maxwell Manufacturing Co., Vancouver, Wash.

[22] Filed: Aug. 13, 1973

[21] Appl. No.: 387,767

[52] U.S. Cl. ............................. 73/184, 116/129 E
[51] Int. Cl. ............................................. G01p 5/02
[58] Field of Search............ 73/184, 186; 116/129 R, 116/129 E

[56] References Cited
UNITED STATES PATENTS

| | | | |
|---|---|---|---|
| 1,272,396 | 7/1918 | Dixon et al.................... | 116/129 E |
| 1,672,666 | 6/1928 | Walsh............................ | 116/129 K |
| 2,152,768 | 4/1939 | Myers............................ | 73/184 |
| 2,525,639 | 10/1950 | Bluhm........................... | 73/186 |
| 2,617,297 | 11/1952 | Moore........................... | 73/186 |
| 2,707,878 | 5/1955 | Cameron et al............... | 73/184 |
| 2,885,536 | 5/1959 | Green et al.................... | 116/129 R X |

*Primary Examiner*—Richard C. Queisser
*Assistant Examiner*—Frederick Shoon
*Attorney, Agent, or Firm*—Eugene M. Eckelman

[57] ABSTRACT

An indicator arranged to be mounted on a boat and having a weight hanging in the water for trailing movement therethrough as the boat moves forward. The weight is suspended on a cable which is secured at its upper end to the bottom of an angular indicating arm pivotally mounted in a housing secured to the boat. The indicating arm has an upper end which projects from the housing and is associated with reference areas on the housing to indicate the speed of the boat.

2 Claims, 6 Drawing Figures

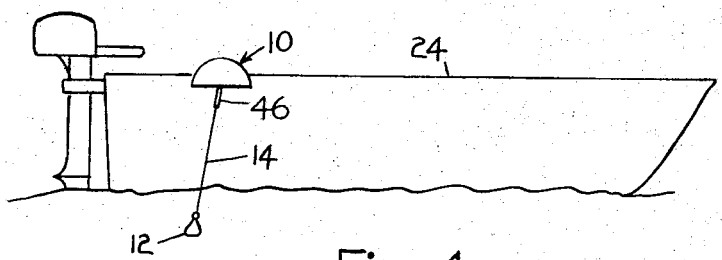
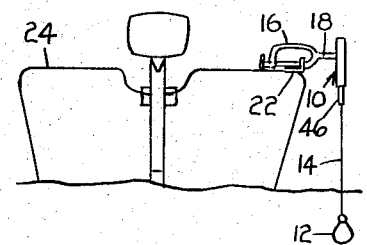
Fig. 1
Fig. 2
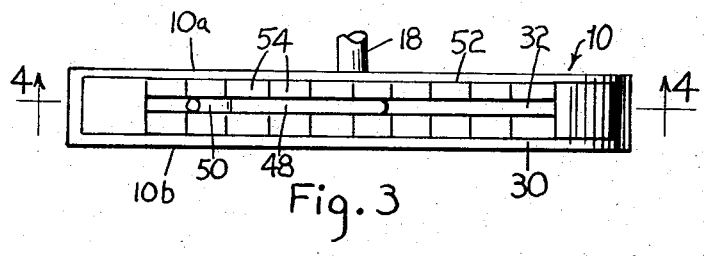
Fig. 3
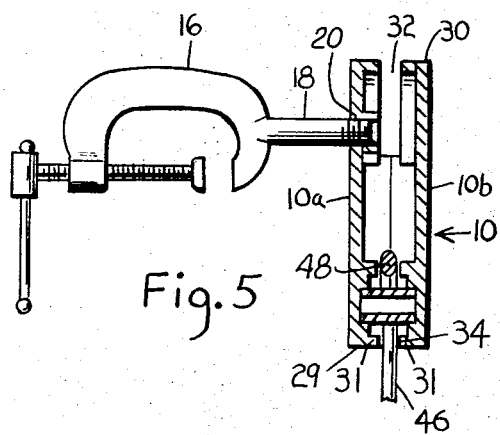
Fig. 5
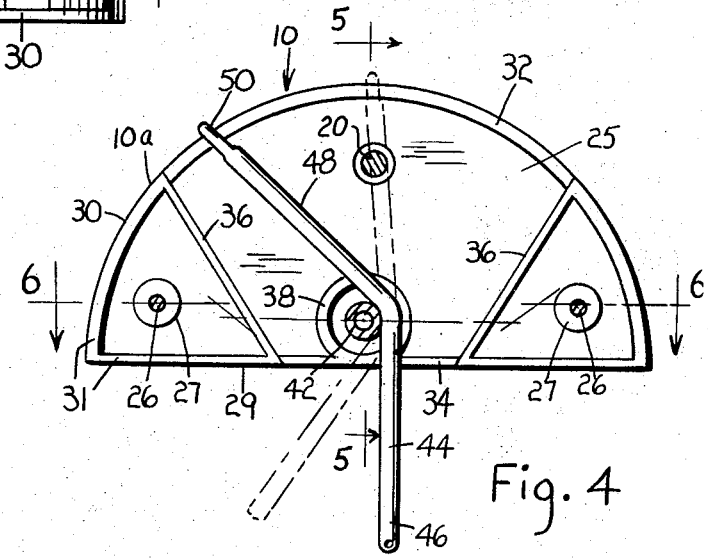
Fig. 4
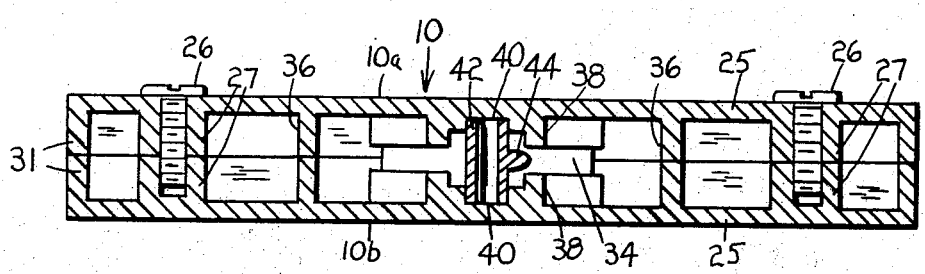
Fig. 6

TROLLING SPEED INDICATOR

BACKGROUND OF THE INVENTION

This invention relates to a new and novel trolling speed indicator for indicating the trolling speed of a boat.

It is desirable in most cases when trolling for fish to operate the lure or bait at a selected speed with relation to the water so that the lure or bait works as desired. Achieving the proper trolling speed can sometimes be accomplished merely by motor settings and the like but such is not completely accurate and furthermore such is not possible where trolling is accomplished in a current since it is difficult to know the speed of the current. Also, if the wind is blowing, a motor setting likewise cannot be used to achieve a precise trolling speed.

SUMMARY OF THE INVENTION

According to the present invention, a device is provided which is arranged to be secured to a boat and which readily indicates the relative speed of the boat and the water so that the operator upon selectively adjusting the speed of the boat can troll at the desired speed and furthermore can achieve similar trolling speeds from one time to the next.

A more particular object of the invention is to provide a device of the type described which employs a housing supporting a hanging weight by means of a pivotal arm in an arrangement such that as the boat moves through the water the arm is pivoted according to the trailing angle of the weight whereby the operator by viewing a point or end of the arm can determine the relative speed of the boat and the water.

Another object is to provide a device of the type described wherein the pivotal arm is associated with color reference means on the housing whereby the relative speed of the boat and the water is readily determined by viewing the position of the pointer in association with the reference means.

The invention will be better understood and additional objects and advantages will become apparent from the following description taken in connection with the accompanying drawings which illustrate a preferred form of the device.

FIGS. 1 and 2 are side and rear elevational views respectively of the present device as mounted on a boat;

FIG. 3 is a top plan view of the present device enlarged with relation to FIGS. 1 and 2;

FIG. 4 is a sectional view taken on the line 4—4 of FIG. 3;

FIG. 5 is a sectional view taken on the line 5—5 of FIG. 4; and

FIG. 6 is a sectional view taken on the line 6—6 of FIG. 4.

DETAILED DESCRIPTION OF A PREFERRED EMBODIMENT

With particular reference to the drawings, and first to FIGS. 1 and 2, the present device comprises a housing 10 adapted to be mounted on the side of a boat for supporting a weight 12 in the water by means of a flexible line 14 such as a cable. As best seen in FIGS. 2 and 5, a C-Clamp 16 has a shank portion 18 provided with a threaded end 20 adapted for threaded securement to the housing. This clamp is arranged to be attached to a right angle bracket 22, FIG. 2, secured on a boat 24 in a selected position such that the housing 10 is supported upright over the side of the boat.

In a preferred construction, the housing is formed of two substantially identical parts 10a and 10b each having flat side walls 25, FIGS. 4 and 6. These parts are secured together by screws 26 engageable in inturned inwardly threaded bosses 27 integral with the two housing sections.

As best seen in FIG. 4, the housing as viewed laterally is semi-circular in shape, having a flat bottom edge 29 and a rounded continuous edge 30 at the ends and top. As seen in FIGS. 4, 5, and 6, the housing sections 10a and 10b have inturned flanges 31 around the periphery thereof. These flanges are cut back a slight amount in an upper portion of the top edge 30 to form a top opening slot 32 and are cut back in a portion of the bottom edge 29 to form a bottom opening slot 34, the top slot having a substantially greater length than the bottom slot. Reinforcing webs 36 are provided which are integral with the side walls 25 and with the flanges 30, and these flanges extend angularly from the adjacent ends of respective top and bottom slots.

Each of housing sections 10a and 10b has an inturned boss 38 adjacent the bottom and centrally with regard to its longitudinal dimension. These bosses have a recess 40 providing a journaled mounting for a cross shaft 42. An arm 44 is integrated with the shaft 42 and has a depending portion 46 to which the cable 14 is attached. An upper end 48 of the arm 44 is angled relative to the depending portion 46 and terminates in a pointer 50. Depending arm portion 46 operates freely in the slot 34 and the pointer 50 operates freely in the slot 32. The end of pointer 50 projects a short distance above the top edge of the housing for easy viewing.

With reference to FIG. 3, reference means 52 are disposed adjacent to the slot 32. Such reference means comprises a strip of weather resistant material such as sheet plastic having a plurality of adjacent color coded areas or sections 54 disposed adjacent to each other. The sections 54 in their color coding are all of different color and are capable of association with pointer 50 such that they provide a reference point therefor in determining relative speeds of movement of the boat and water. That is, in the use of the present device a selected speed is first determined empirically or otherwise which results in the best fishing. The position of the pointer 50 in relation to the coded sections 54 is then noted. When the next trolling operation gets under way, the operator need only control the throttle of the boat motor selectively to bring the pointer 50 to the same coded section. Such will likely be the speed at which the lure or bait works best or at least best attracts the fish. Since the present device shows the relative speed between the boat and the water, it operates effectively even though the boat is travelling through a current or in a wind. The arm 44, being of angular construction, allows placement of the reference means 52 centrally on the curved top edge 30 for easy viewing.

It is to be understood that the form of our invention herein shown and described is to be taken as a preferred example of the same and that various changes in the shape, size and arrangement of parts may be resorted to without departing from the spirit of our invention, or the scope of the subjoined claims.

Having thus described our invention, we claim:

1. A trolling speed indicator for a boat comprising a. a housing having an interior portion defined by side walls, end walls, and top and bottom walls,
b. said top wall being rounded,
c. means on said housing arranged to support it over the edge of a boat,
d. means defining a longitudinal slot in both the top and bottom walls of said housing,
e. an arm pivotally supported intermediate its ends in said housing,
f. said arm having a lower end portion projecting through the slot in the bottom wall of said housing and having an upper end portion projecting through the slot in the top wall of said housing,
g. reference means on the rounded top wall of said housing adjacent to said slot and having reference points extending through the length of the slot designating various relative speeds of the boat and water in order that the operator can achieve similar trolling speeds from one time to the next,
h. the upper end portion of said arm extending angularly relative to the lower end portion thereof so as to be disposed at one end of said reference means when said lower end portion extends substantially straight downwardly,
i. and drag means connected to the lower end of said arm arranged to engage the water whereby the arm is positioned at different positions with relation to said reference means depending upon the relative speed of the boat and water.

2. The trolling speed indicator of claim 1 wherein the pivotal support for said arm is located adjacent to the bottom of said housing, the slot in the bottom wall of said housing being of shorter length than the slot in the top wall, and diverging web means extending from each end of said slot in the top wall to each end of said slot in the bottom wall.

* * * * *